United States Patent [19]

Lambert et al.

[11] Patent Number: 4,915,488
[45] Date of Patent: Apr. 10, 1990

[54] MIRROR SHADE SCREEN

[76] Inventors: Mack R. Lambert, 44 Powerline Rd.; Mack R. Lambert, Jr., 43 Powerline Rd., both of Pearl River, La. 70452

[21] Appl. No.: 841,252

[22] Filed: Mar. 19, 1986

[51] Int. Cl.$^4$ .............................................. G02B 17/00
[52] U.S. Cl. .............................. 350/277; 350/276 R; 350/283; 350/320
[58] Field of Search ................... 350/276 R, 277, 283, 350/278, 280, 322, 276 SL, 321, 320; 296/97 B, 97 A; 358/252, 255

[56] References Cited

U.S. PATENT DOCUMENTS

| | | | |
|---|---|---|---|
| 2,045,751 | 6/1936 | Burlein | 350/283 |
| 2,070,434 | 2/1937 | Kangas | 350/283 |
| 2,637,246 | 5/1953 | Wolk | 350/283 |
| 2,709,945 | 6/1955 | Kuhn | 350/283 |

*Primary Examiner*—Bruce Y. Arnold
*Assistant Examiner*—Loha Ben
*Attorney, Agent, or Firm*—Wenderoth, Lind & Ponack

[57] ABSTRACT

A mirror shade screen is made by providing a shade screen material dimensioned so as to cover and overlap the edges of a particular mirror. The shade screen material is then provided with a draw string, an elastic strip or Velcro (nylon hook and loop tape fastener) strip in order to hold the shade screen material onto the mirror. The mirror shade screen is particularly adapted to rear view mirrors of automotive vehicles, such as outside truck and car mirrors.

18 Claims, 4 Drawing Sheets

MIRROR SHADE SCREEN

BRIEF SUMMARY OF INVENTION

This invention relates to a mirror shade screen having a draw string, an elastic strip or VELCRO (nylon hook & loop tape fastener) strip attached to the shade screen to serve as a method of holding the shade screen to an outside rear view mirror of an automotive vehicle for night driving to reduce the intensity of light reflected into the driver's eyes from following vehicles, while still permitting the driver to observe the approach of vehicles from the rear.

An object of the invention is to provide a simple method of holding a shade screen on an outside rear view mirror, a method that requires no mechanical connections, is easily installed and removed, and requires no alteration or replacement of the mirror. The shade screen is to utilize a loose weave or formed sheer type cloth that is semi-transparent and is flexible enough to be pulled snugly around mirrors of varying size and shape, and be held in place by one of the above methods. In the present invention, a shade screen of one size will conform to a wide variety of sizes and shapes of mirrors.

Other more specific objects and features of the invention will be apparent from the detailed description set forth below.

DETAILED DESCRIPTION OF THE INVENTION

Figure 1:
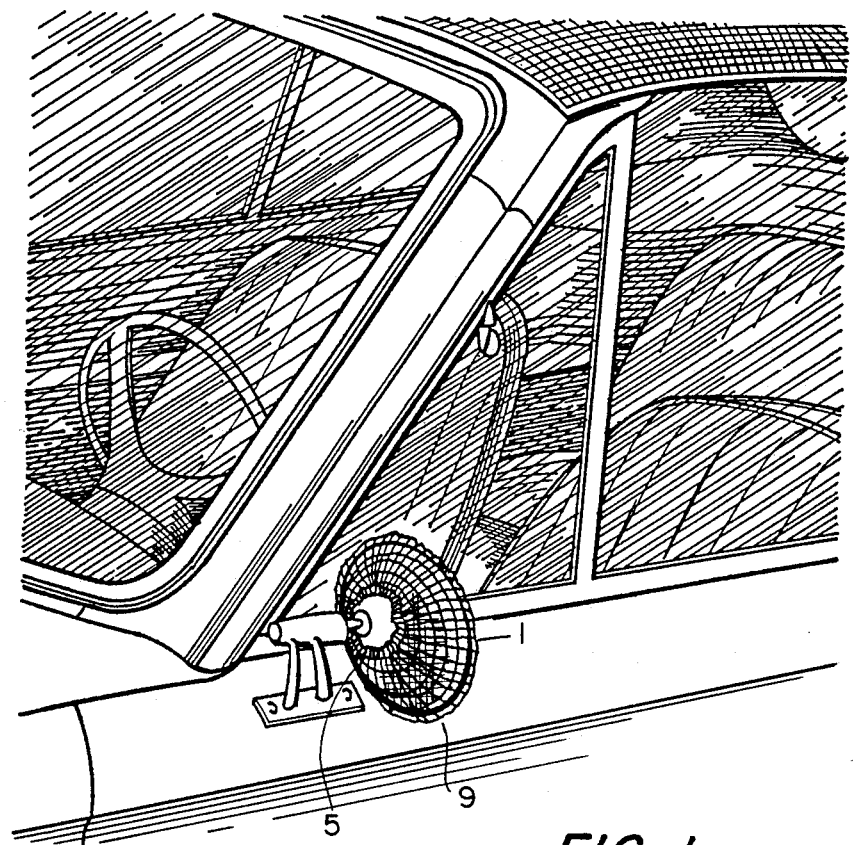
FIG. 1 is a perspective view of a first embodiment of a mirror shade screen according to the present invention, shown in use on an automotive vehicle.

Referring to the drawings, a fabric shade screen 1 is a soft and flexible material made from an open mesh, non shrink, and water resistant material, such as nylon or plastic, that is of an appropriate shading effect, and that will conform to different sizes, shapes and contours of mirrors 7.

Figure 2:
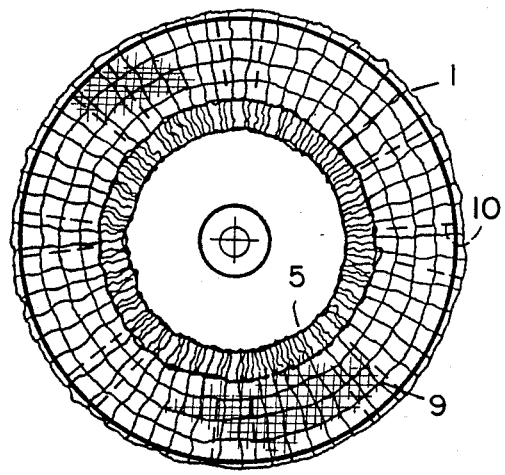
FIG. 2 is a rear view of the mirror shade screen of FIG. 1.
Figure 3:
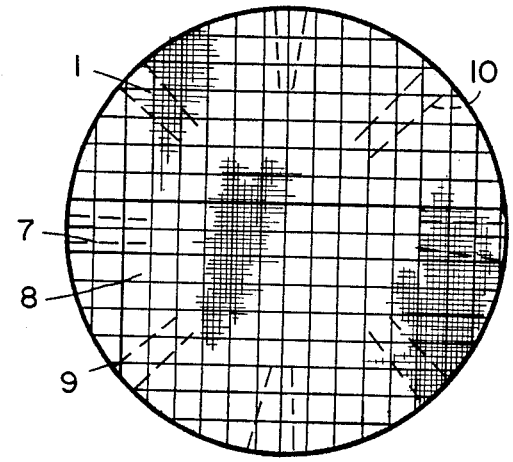
FIG. 3 is a front view of the mirror shade screen of FIG. 1.

In FIG. 1, the round outside rear view mirror 7 attached at the back side to the mirror frame 8 requires a round piece of the shade screen 1, approximately four inches larger in diameter than the mirror 7, and a strip of elastic 5 having a length smaller than the circumference of the mirror 7. The shade screen 1 will be held in place using the following method. The elastic 5 is to be stretched to its fullest extent and sewn, while extended, to the perimeter of the shade screen 1. When the shade screen 1 is attached to the mirror 7, the larger diameter of the shade screen 1 will allow the shade screen 1 to lap over the edge to the back side of the mirror 7, FIG. 2, and be held snugly to the mirror 7, FIG. 3, by the contraction of the elastic 5. The mirror shade screen has a number of pleats 10 taking up material about the circumference of the shade screen.

Figure 4:
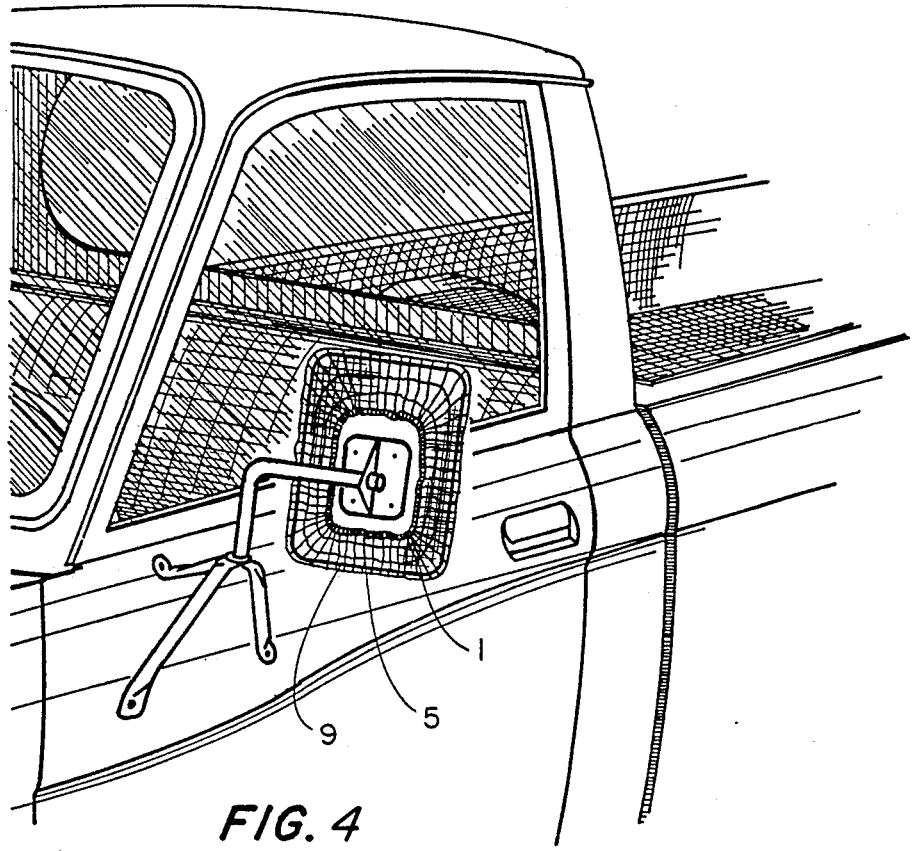
FIG. 4 is a perspective view of a mirror shade screen according to a second embodiment of the present invention.
Figure 5:
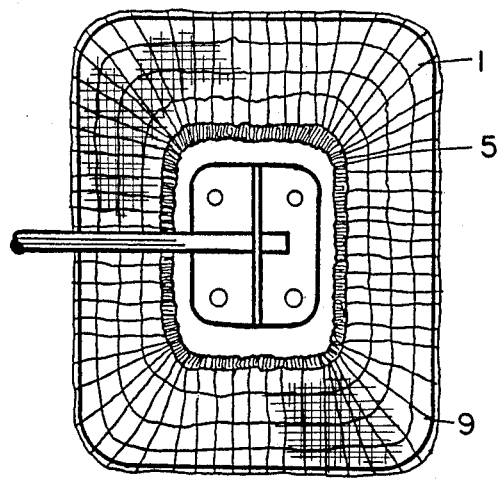
FIG. 5 is a rear view of the mirror shade screen of FIG. 4.
Figure 6:
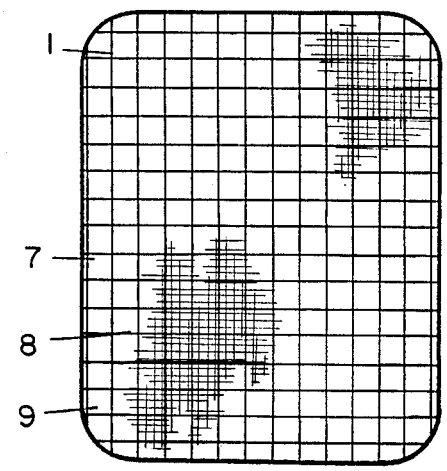
FIG. 6 is a front view of the mirror shade screen of FIG. 4.

In FIG. 4, a rectangular or square outside rear view mirror 7 attached at the back side to the mirror frame 8, requires a rectangular or square piece of the shade screen 1 approximately four inches wider and longer than the width and length of the mirror 7, and a piece of elastic 5 having a length smaller than the perimeter of the mirror 7. The shade screen 1 will be held in place using the following method. The elastic 5 is stretched to its fullest extent and sewn, while extended, to the perimeter of the shade screen 1. When the shade screen 1 is attached to the mirror 7, the larger size of the shade screen 1 will allow the shade screen 1 to lap over the edge to the back side of the mirror 7, FIG. 5, and be held snugly to the mirror 7, FIG. 6, by the contraction of the elastic 5.

Figure 7:
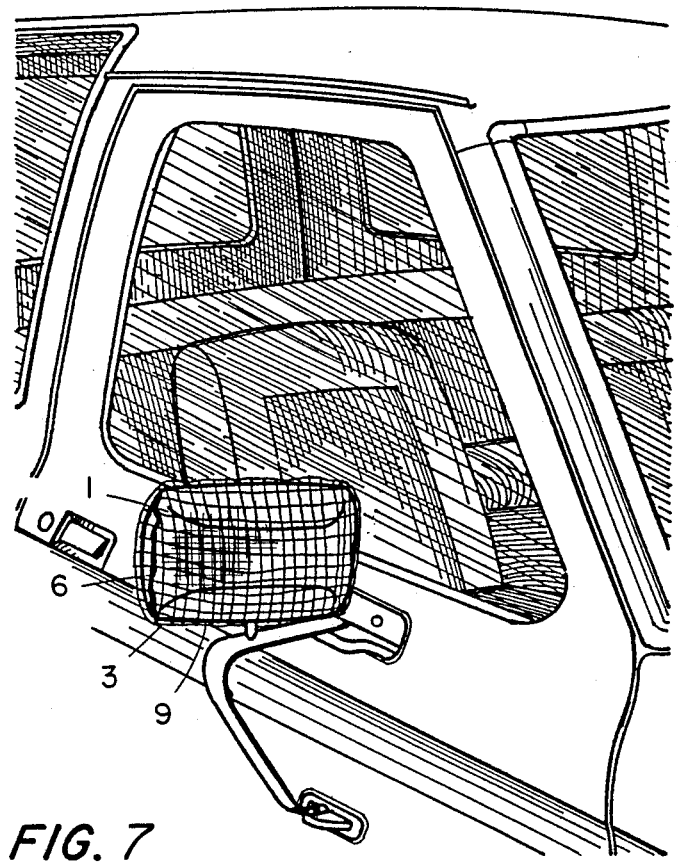
FIG. 7 is a perspective view of a mirror shade screen according to a third embodiment of the present invention.
Figure 8:
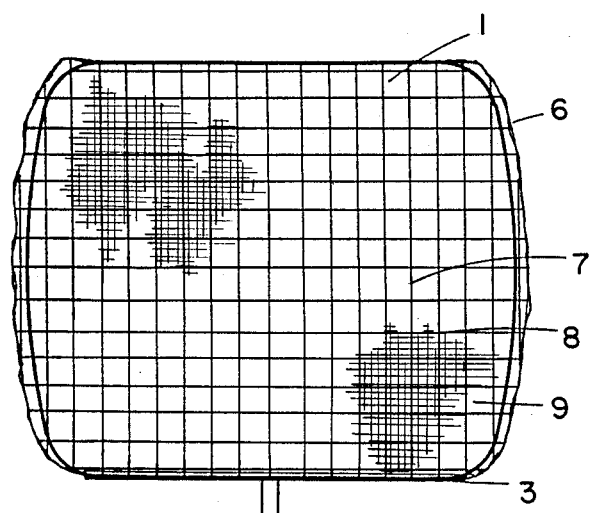
FIG. 8 is a front view of the mirror shade screen of FIG. 7.
Figure 9:
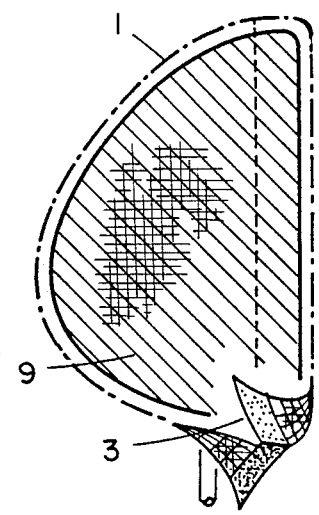
FIG. 9 is a side view of the mirror shade screen of FIG. 7.

In FIG. 7, a rectangular or square outside rear view mirror 7 attached at the edge to the mirror support frame 8, will require an envelope type shade screen 1. The envelope type shade screen 1 will require two pieces of shade screen 1, each being approximately four inches longer and wider than the mirror 7. The two pieces of shade screen 1 are to be placed one on top of the other and sewn together on three sides 6, thereof FIG. 8, leaving the side on which the mirror 7 is attached to the mirror support frame 8 open. The shade screen 1 will be held in place using the following method. A strip of VELCRO 3, (nylon hook & loop tape fastener), is sewn to the inside edges of the open side of the shade screen 1, FIG. 9, the hook part to one edge and the loop part to the other edge. When the shade screen 1 is placed on the mirror 7, the VELCRO 3 (nylon hook & loop tape fastener) is pressed together closing the open side and holding the shade screen 1 in place. Alternatively, the envelope type shade screen can be provided with a hem along the open side. A draw string is then installed in the hem, and is used to draw together the open side to hold the mirror shade screen in place on the mirror.

Figure 10:
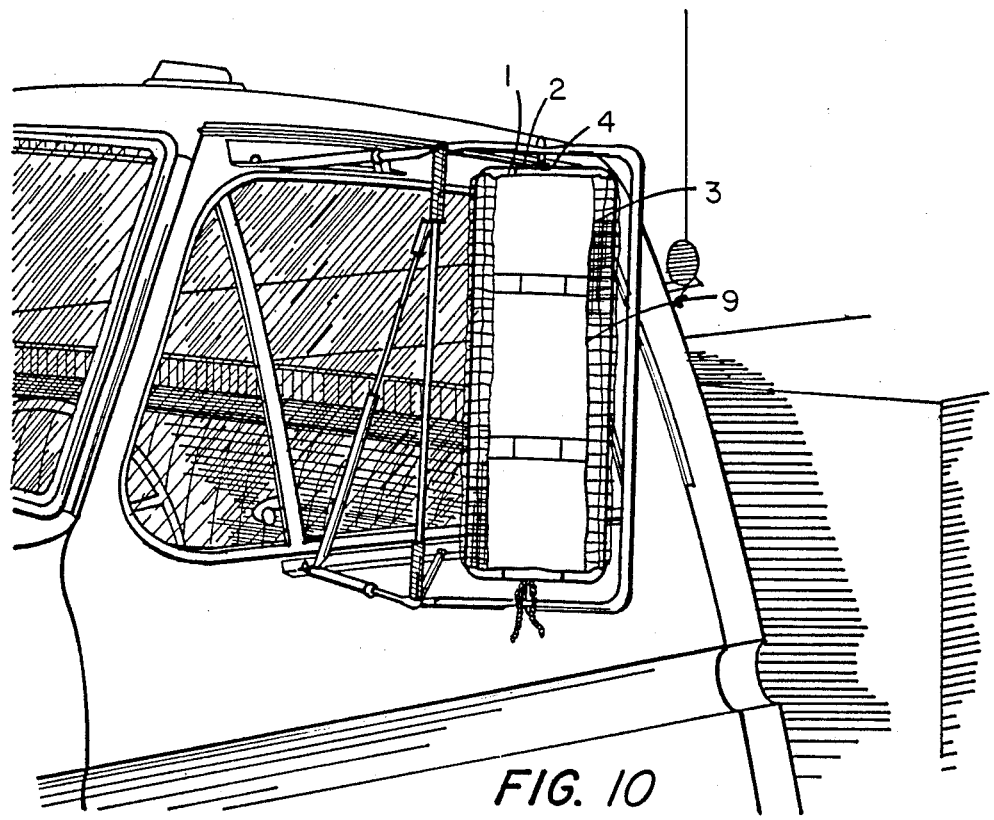
FIG. 10 is a perspective view of a fourth embodiment of the mirror shade screen according to the present invention.
Figure 11:
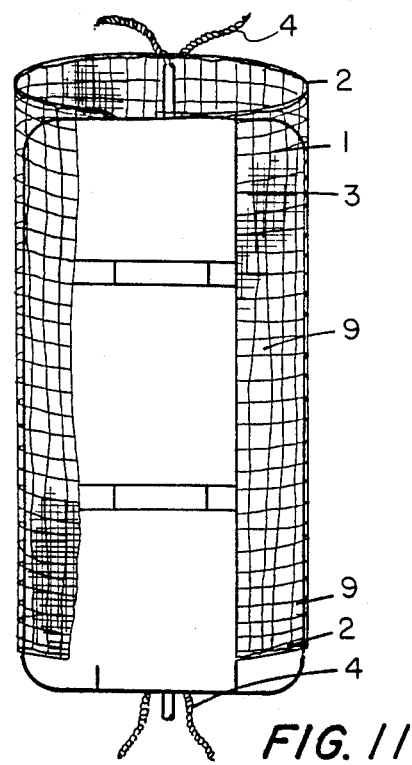
FIG. 11 is a rear view of the mirror shade screen according to FIG. 10.
Figure 12:
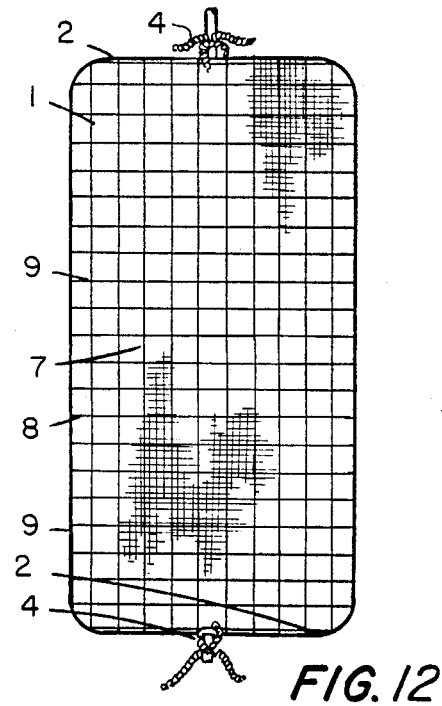
FIG. 12 is a front view of the mirror shade screen according to FIG. 10.

FIG. 10 shows a truck type outside rear view mirror 7, that is rectangular in shape and attached to the mirror support frame 8 at the top and bottom edges with the shade screen 1 in place. The shade screen 1 for this type mirror 7 requires a piece of shade screen 1 wider than the width of the mirror 7 and approximately one inch longer than the mirror 7, two strips of seam binder 2, each equal in length to the width of the shade screen 1, two pieces of string 4 approximately eight inches long, and two strips of VELCRO 3 (nylon hook & loop tape fastener) sufficient in length to extend across the back of the mirror. One strip of seam binder 2 is to be sewn to the top, and one strip to the bottom horizontal edges of the shade screen 1, as an edge finisher to prevent raveling. The shade screen 1 will be held in place using the following method. One piece of string 4 is to be sewn with the seam binder 2 to the top and bottom edges of the fabric, in the center, for the purpose of tying the shade screen 1 to the mirror frame 8 to prevent movement of the shade screen 1 up or down. The Velcro (nylon hook and loop tape fasteners) strips 3 extend horizontally from the respective edges of the shade screen fabric 1. A hook portion of a Velcro strip 3, noting FIGS. 10 and 11, is sewn to one edge, with a portion thereof extending beyond the edge of the shade screen, and a loop portion is sewn to the opposite edge of the shade screen, also extending beyond the shade screen, at a corresponding vertical position. As can be seen from FIGS. 10 and 11, two such sets of hook and loop portions are provided, vertically spaced on the shade screen fabric's edges. When the shade screen 1 is placed on the mirror 7, it is wrapped around the mirror 7, the VELCRO (nylon hook & loop tape fastener) strips are placed and pressed together at the back side of the mirror 7, and the string 4 are tied to the frame 8 at the top and bottom, holding the shade screen 1 snugly in place, as seen in FIG. 12.

What is claimed is:

1. A method of making a mirror shade screen for a rear view mirror of a truck, said method comprising the steps of:
   providing a shade material dimensioned so as to be able to cover and lap over edges of the mirror;
   providing a fastening strip for fastening said shade material to the mirror, said fastening strip comprising first and second portions;
   attaching said first portion of said fastening strip to one edge of said shade material;
   attaching said second portion to another edge of said material; and
   providing a string attached to one end of said material for tying said one end of said material to the mirror.

2. The method of making a mirror shade screen as set forth in claim 1, and further comprising the steps of:
   providing a second fastening strip, said second fastening strip also comprising respective first and second portions; and
   attaching said first portion of said second fastening strip to said one edge and said second portion of said second fastening strip to said another edge of said material.

3. The method of making a mirror shade screen as set forth in claim 2, wherein:
   said respective steps of attaching comprise sewing said respective first and second portions to respective edges of said shade material.

4. The method of making a mirror shade screen as set forth in claim 2, wherein:
   said first and second fastening strips both comprise Velcro-type fastening strips having said respective first and second portions.

5. A method of making a mirror shade screen for a rear view mirror of an automotive vehicle, said method comprising the steps of:
   providing a shade screen material;
   forming an envelope from said shade screen material, said envelope having a plurality of sides and an opening along one of said sides for placing said envelope about the mirror;
   providing a fastening arrangement for fastening said opening when said envelope has been placed about the mirror, said fastening arrangement comprising first and second portions;
   disposing said first portion of said fastening arrangement at one edge of said opening, and disposing said second portion of said fastening arrangement at another edge of said opening, whereby said first and second portions can be connected together to close said opening and hold said envelope on the mirror.

6. The method of making a mirror shade screen as set forth in claim 5, wherein:
   said step of providing said fastening arrangement comprises providing a Velcro-strip fastening strip, said Velcro-type fastening strip comprising said first portion and said second portion.

7. The method of making a mirror screen as set forth in claim 6, wherein:
   said step of attaching comprises sewing said first and second portions to respective edges of said shade screen material.

8. The method of making a mirror shade screen as set forth in claim 5, wherein:
   said step of attaching comprises sewing said first and second portions to said respective edges.

9. A method of making a mirror shade screen for a rear view mirror of an automotive vehicle, said method comprising the steps of:
   providing a shade material having a perimeter dimensioned so as to be able to cover and lap over edges of the mirror;
   providing an elastic strip; and
   sewing said elastic strip to the perimeter of said shade material such that said elastic strip will contract about the back of the mirror and hold said shade material on the mirror when the shade material is placed on the mirror.

10. A mirror shade screen for shading a rear view mirror of a truck, comprising:
    a shade material dimensioned so as to be able to cover and lap over edges of the mirror;
    a fastening strip for fastening said shade material to the mirror, said fastening strip comprising first and second portions;
    said first portion of said fastening strip attached to one edge of said shade material;
    said second portion of said fastening strip attached to another edge of said material; and
    a string attached to one end of said material for tying said one end of said material to the mirror.

11. The mirror shade screen as set forth in claim 10, and further comprising:
    a second fastening strip, said second fastening strip also comprising respective first and second portions, said first portion of said second fastening strip attached to said one edge of said material and said second portion of said second fastening strip attached to said another edge of said material.

12. The mirror shade screen as set forth in claim 11, wherein:
    said respective first and second portions are sewn to respective edges of said shade screen material.

13. The mirror shade screen as set forth in claim 11, wherein:
    said first and second fastening strips both comprise Velcro-type fastening strips having said respective first and second portions.

14. A mirror shade screen for a rear view mirror of an automotive vehicle, comprising:

an envelope made from a shade screen material, said envelope having a plurality of sides, and an opening along one of said sides for placing said envelope about the mirror; and a fastening arrangement for fastening said opening when said envelope has been placed about the mirror, said fastening arrangement comprising first and second portions, said first portion of said fastening arrangement disposed at one edge of said opening and said second portion of said fastening arrangement disposed at another edge of said opening, whereby said first and second portions can be connected together to close said opening and hold said envelope on the mirror.

15. The mirror shade screen as set forth in claim 14, wherein:

said fastening arrangement comprises a Velcro-type fastening strip, said Velcro-type fastening strip comprising said first portion and said second portion.

16. The mirror shade screen as set forth in claim 15, wherein:

said first and second portions are sewn to respective edges of said opening.

17. The mirror shade screen as set forth in claim 14, wherein:

said first and second portions are sewn to said respective edges.

18. A mirror shade screen for a rear view mirror of an automotive vehicle, comprising:

a shade material having a perimeter dimensioned so as to be able to cover and lap over edges of the mirror; and an elastic strip sewn to the perimeter of said shade material such that said elastic strip will contract about the back of the mirror and hold said shade material on the mirror when the shade material is placed on the mirror.

* * * * *